United States Patent Office 3,709,782
Patented Jan. 9, 1973

3,709,782
HETEROPLOID CELL LINES
Sydney Edwin Smith, Kevin J. O'Reilly, and John Prydie, London, England, assignors to Burroughs Wellcome Co., Research Triangle Park, N.C.
No Drawing. Filed Oct. 3, 1969, Ser. No. 863,715
Claims priority, application Great Britain, Oct. 8, 1968, 47,737/68
Int. Cl. C12k 1/06, 7/00, 9/00
U.S. Cl. 195—1.8       4 Claims

ABSTRACT OF THE DISCLOSURE

A heteroploid cell line produced by culturing and subculturing a diploid cell line in a medium providing the necessary nutritional composition such that the total passaging of the cell line exceeds the 40th to 50th passage level and until the proportion of cells having abnormal chromosomal characteristics rises above 25% of the total. The diploid cell line is derived from tissues of feline embryos which have been cultured and subcultured up to the 40th passage level. The heteroploid cell line is separated from the culturing medium and inoculated with a virulent strain of a virus so as to propagate the virus thereon. The propagated virus strain is then further passaged on heteroploid cell lines to produce an attenuated antigenic material that may be used in a vaccine. The propagated virus strain may also be inactivated with a suitable inactivating agent so as to produce an inactivated antigenic material that may be used in a vaccine.

---

This invention relates to heteroploid feline embryonic cell lines, to the growth of viruses thereon, and to vaccines containing such viruses.

It has already been described in Derwent Basic Report No. 28,149 of Sept. 12, 1967, which describes Netherlands patent application No. 6702396 (laid open to public inspection on Aug. 21, 1967), and in U.S. application Ser. No. 615,922 filed Feb. 14, 1967, now U.S. Pat. 3,520,972 issued July 21, 1970, that novel strains, or according to the new terminology "diploid cell lines," derived from feline (cat) embryonic cells are capable of supporting pathogenic viruses. These lines are substantially diploid since at least 75% of the cells have their chromosomal composition unchanged.

It has now been found that the above cell lines can be substantially modified and converted into heteroploid cell lines by passaging them further beyond the 40th to 50th passage level. The propagation of these cell lines slows down somewhat between the 35th and 45th passage level, and chromosome abnormalities increasingly occur while the line loses its substantially diploid character, as defined above. After the proportion of abnormal cells rises above 25%, the line becomes an established heteroploid cell line, with epithelial characteristics from the morphological point of view, and is capable of producing tumours in hamster cheek pouches. It also regains its ability for fast growth, and can now form colonies in a semi-solid agar medium.

The feline embryonic cell lines so produced can be directly infected with certain pathogenic viruses, such as the feline infectious enteritis, rhinotracheitis, bovine (herpes) mammalitis, cat leukaemia viruses and feline picornaviruses in spite of the heteroploid chromosomal and morphological characteristics. Furthermore, the same viruses can now be grown and transferred and passaged from one culture of such a line into another, without exposing the virusues to contamination or varying enviromental conditions.

These heteroploid cells lend themselves to mass production for this purpose and can be quickly grown and cultured in a neutrient medium. Any medium known in the art which provides the necessary physical and chemical conditions and nutritional composition for culturing and sub-culturing, i.e. for maintenance, individual growth, and multiplication of these cells, may be used.

It has, however, been preferred to use Eagle's Basal Medium with some bovine serum and particularly the same medium with tryptose phosphate broth and with twice the usual amount of amino acids and vitamins. This process is advantageously carried out at a temperature range from 32° C. to 39° C., preferably within 35° C. to 37.5° C. To facilitate sub-culturing, it is customary to treat the confluent sheets of the cells of the line with trypsin or an innocuous chelating agent, such as ethylenediamine tetra-acetic acid (EDTA), before each transfer into new medium.

In addition to the usual monolayer cultures using the above media, it may also be possible to culture the heteroploid cell line according to the present invention in suspended cell cultures in a similar liquid medium.

In order to infect the cell line with the virus, the culture of the cell line may be mixed with a saline suspension of the virus, for instance obtained from the exudate of any infected animal or from other sources. In the case of the feline infectious enteritis virus, it has been preferred to use infected small intestine, mesenteric lymph node, bone marrow, faeces, and spleen of cats.

After the cell line has been infected, its is incubated as described above. Samples are then tested for intra-nuclear changes by staining the culture with haemotoxylin and eosin. At about 18 hours after infection, the infected nuclei (about 1–2% of all the nuclei) take up more haematoxylin than the non-infected nuclei. This is followed in the next 6 hours by enlargement of the nucleoli, homogenous darkening of the other nuclear contents and the development of a clear zone surrounding the nucleolus or nucleoli, if more than one present, and another clear zone immediately inside the nuclear membrane. During the next 24 hours the infected cells appear to shrink and stain almost black before finally detaching from the coverslip. When changes become clearly evident, a few days after infection, the infected culture may be stored frozen at −30° C. This destroys the cells, but the virus retains its ability to infect new, uncontaminated cultures of the same cell line.

It is possible to attenuate or further attenuate a virus strain, to which the heteroploid feline embryonic cell line is susceptible, by serial passages in cultures of the cell line. The novel cell line can therefore not only be used for growing such viruses but also for attenuating them, with advantage, since they are more easily handled in the heteroploid stage than in the diploid one. Thus the virus can be produced on a large scale more easily and reliably owing to the fact that the heteroploid line can be multiplied and sub-cultured for this purpose without limitation or substantial risk of deterioration of quality.

According to the present invention in any one aspect, therefore there is provided a continuous feline embryonic heteroploid cell line, comprising cells originating from feline embryos, with more than 25% of the cells having abnormal chromosomal characteristics as compared with the chromosomes of cells of feline embroyos. In a particular aspect such a cell line is obtained by successive passaging of a diploid cell line, which has been originally derived from tissue of feline embryos, beyond the 40th to 50th passage level until the proportion of cells having abnormal chromosomal characteristics rises above 25% of the total.

The cell line according to the present invention can be presented in association with a suitable culture medium, as a continuous feline embryonic heteroploid cell culture. As already stated such medium is preferably the Eagle's Basal Medium, if necessary modified to contain various amounts of other ingredients aiding the growth and maintenance of the culture. In another aspect there is provided a method of growing and passaging the cell line hereinbefore defined or a culture thereof, which comprises culturing the cell line in a nutrient medium and transfering some or all of the cells into a fresh nutrient medium.

The novel cell line is eminently suitable for propagating viruses, particularly the feline infectious enteritis, feline rhinotracheitis, or feline picornaviruses, the bovine (herpes) mammalitis and the cat leukaemia virus. The method for propagating a virus susceptible to such cell lines, or selected from the above defined group, comprises the steps of preparing the heteroploid cell line as a culture free from contaminating micro-organisms, inoculating the said culture with a strain of the virus, and maintaining the culture of host cells so infected to produce a multiplication of the non-contaminated strain of said virus. The viruses so produced represent antigenic material which may be utilized in an inactivated or attenuated form.

For the purpose of inactivation the viral strain may, for instance, be treated by physical means or by a chemical agent which kills the virus and thereby deprives the strain from its infectivity and pathogenicity without, however, removing its ability to induce an immunogenic response in the animal to be protected against the infection with a virulent strain of the same virus. For instance formaline or $\beta$-propiolactone have been found suitable for inactivating such viruses, in particular the feline rhinotracheitis virus.

Virulent strains of the above group may be propagated and serially passaged in the heteroploid cell line provided by the present invention and become sufficiently attenuated without losing their immunogenicity. The present invention, therefore, also provides a method of attenuating a virus selected from the above group, which comprises the step of preparing the heteroploid cell line as a culture free from contaminating micro-organisms, inoculating the said culture with a virulent strain of the virus, serially passaging such an infected culture of the virus by using cultures of the heteroploid cell line free from contaminating micro-organisms until the passaged virus loses its infectivity and pathogenicity but still retains its immunogenicity. The number of passages depends on the virulence of the virus strain and it might be necessary to passage it more than forty times to obtain a satisfactory strain. Advantageously the attenuated strain so provided will not revert to the virulent state when passing from the inoculated animal into other animals in contact with the former.

The antigenic material, consisting of inactivated or attenuated viruses provided by the use of the feline heteroploid cell line according to the present invention, can be presented as a vaccine in association with a pharmaceutically acceptable carrier. The carrier may take the form by an injectible liquid, such as an aqueous buffered saline solution, or a solid carrier containing, for instance, stabilizers or other additives. Stabilizers which have been found to be suitable for the purpose include degraded gelatine, marketed as "Sol-u-pro," or sorbitol.

According to the present invention in a further aspect there is provided a method of protecting animals, in particular cats, against feline infectious enteritis, or feline rhinotracheitis or infections with feline picornaviruses, or cat leukaemia. In a similar manner cattle may be protected against bovine (herpes) mammalitis. The respective methods comprise the inoculation of the susceptible animal with a vaccine against the appropriate disease as hereinbefore defined, containing sufficient antigenic material to convey protection against a natural infection with a wild strain of the particular virus.

Both the attenuated and inactivated vaccines against feline infectious enteritis have successfully protected cats against a challenge with such a wild strain of the virus. It is preferred to use an inactivated strain of the rhinotracheitis virus prepared according to the present invention and presented as a vaccine for the protection of cats against the disease.

The following examples illustrate the invention.

EXAMPLE 1

A sample, representing at least about $1 \times 10^6$ cells of a culture of the cell strain at the 40th passage level, produced according to Example 1 of U.S. Pat. 3,520,972, was transferred into a 4 oz. (112 ml.)—medical flat bottle, which contained Eagle's Basal Medium (80 parts by volume) (cf. H. Eagle, Science, 1955, 122, 504), modified to have twice the usual amount of amino acids and vitamins, tryptose phosphate broth (10 parts by volume), and bovine serum (10 parts by volume) as a sterile solution.

The monolayer cultures so formed were subcultured by serially passaging the content of one flask into 2 or 3 flasks once or twice weekly. The cells were resuspended for this purpose with a 0.5% solution of sodium edetate in a 0.1% solution of trypsin in the above type of phosphate buffered saline.

It was observed that the growth rate slowed down until about the 45th passage level, but became normal again afterwards. Chromosome abnormalities became increasingly common and the culture gradually acquired a heteroploid character. The cell line so obtained was further passaged to the 61st level.

EXAMPLE 2

Another sample of the 12th passage level of the culturing process described in Example 5 of U.S. Pat. 3,520,972 was propagated by serial passages according to the method of Example 1 above, and the sell strain thus obtained was gradually converted into a heteroploid cell line which was further passaged until the 61st level.

EXAMPLE 3

Both cell lines described in Examples 1 and 2 were infected at various passage levels with feline infectious enteritis virus taken from a single pool, as described in the U.S. patent referred to. The cell lines were found to be similarly susceptible to the virus as the original cell strains, and the degree of infection was expressed by the percentage of infected cells at a twofold dilution level of the virus.

The results are tabulated as follows:

Percent infected cell at 2× dilution of virus infected with virus obtained from one pool (A)

| Passage level of cells | % |
|---|---|
| 41 | 68 |
| 44 | 70 |
| 47 | 75 |
| 50 | 65 |
| 50–51 (mixed) | 70 |
| 53 | 70 |
| 54 | 67 |
| 56 | 70 |
| 56 | 71 |
| 57 | 70 |
| 58 | 69 |
| 59 | 69 |
| 60 | 64 |
| 61 | 61 |

(B)

| Passage level of cells | % |
|---|---|
| 12 | 44 |
| 14 | 77 |
| 17 | 69 |
| 20 | 71 |
| 23 | 72 |
| 32 | 72 |
| 36 | 74 |
| 37 | 77 |
| 42 | 75 |
| 49 | 73 |
| 55 | 76 |
| 61 | 72 |

Feline infections enteritis virus was further serially passaged in various cultures of the feline embryonic cell line, some of the cultures being in the diploid and some in the heteroploid stage. In each case, when intranuclear changes became evident, by staining with haematoxylin and eosin, the infected cultures were frozen and stored at −30° C.

The virus stored frozen at −30° C. was later thawed and passaged in non-infected cultures of feline embryonic cell lines. At the appropriate time, as judged by the presence of intronuclear changes, the infected cultures of the cells were again stored frozen at −30° C. until the next passage.

When passaging the virus in feline embryonic cell lines, it was customary to add the virus simultaneously with the cells and growth media to the culture vessel. The culture of embryonic cell strains containing the virus inoculum was incubated at 37° C.

The virus strain, for which attenuation for cats is claimed, was this serially passaged in feline cell lines originating from the lungs of the embryos. The final stages, achieving satisfactory attenuation, were as follows:

| Passage level of virus | Passage level of cells |
|---|---|
| Diploid lines: | |
| 40 | 15 |
| 41 | 17 |
| 42 | 18 |
| 43 | 20 |
| 44 | 26 |
| Heteroploid lines: | |
| 45 | 53 |
| 46 | 55 |
| 47 | 56 |
| 48 | 60 |
| 49 | 62 |
| 50 | 64 |
| 51 | 65 |
| 52 | 70 |
| 53 | 71 |

The 48th passage level of the virus was tested in cats by inoculating three experimental animals with one millilitre of the virus suspension.

Results are as follows:

GEOMETRIC MEAN LEUCOCYTE COUNT

| Day | After vaccination of 3 cats | After challenge with virulent FIE virus administered orally | |
|---|---|---|---|
| | | 3 vaccinated cats | 3 control cats |
| 0 | 9,800 | 5,200 | 21,000 |
| 1 | 8,700 | (1) | (1) |
| 2 | 7,200 | (1) | (1) |
| 3 | 6,700 | 8,600 | 10,400 |
| 4 | 5,700 | 9,100 | 15,300 |
| 5 | 5,700 | 8,300 | 12,300 |
| 6 | 6,600 | 10,900 | 5,400 |
| 7 | 7,200 | 9,000 | 2 1,500 |
| 8 | 9,300 | 9,500 | 2 1,800 |
| 9 | 10,000 | 9,300 | 2,600 |
| 10 | 9,400 | 12,100 | 9,500 |

1 Not done.
2 One control cat died on 7th and 8th days.

It was shown that the attenuation process was successful and the heteroploid feline embryonic cell line may be used for such purpose with advantage.

EXAMPLE 4

Cultures of the feline embryonic heteroploid cell line obtained in Example 1 were infected with a sample of nasal or ocular exudate of a cat suffering from feline rhinotracheitis. The exudate was mixed with a phosphate-buffered saline solution (2.0 ml.) containing also 200 units of pencillin and 100 mg. of streptomycin per millilitre.

Cell line monolayers were prepared according to Example 1 in five separate tubes. The nutrient was removed and replaced with the exudate-buffer mixture and incubated at 37° C. for 2 hours. The exudate buffer mixture was then removed and the cells washed with fresh sterile buffer solution. The infected tubes containing fresh nutrient medium (1.5 ml. per tube) were then incubated at 37° C. in fresh nutrient medium (1.5 ml.).

Daily microscopic examination of the infected cultures and control cultures, prepared with sterile saline solution instead of the exudate-buffer mixture followed.

Viral cytophathic effect was observed. Other tests demonstrated that the infected cultures were free of other micro-organisms. The virus could be transmitted serially to fresh tube cultures of the same cell strain in which similar cellular degenerative changes took place. Suitable dilution experiments further demonstrated that multiplication of the virus had taken place.

The viruses obtained in this manner can be inactivated by treatment with formaline or β-propiolactone according to the usual procedure known in the art, and cats inoculated with the vaccine so produced. The results show that a satisfactory degree of immunity against a challenge with a virulent strain of the rhinotracheitis virus has been attained.

EXAMPLE 5

Cultures of the feline embryonic heteroploid cell line obtained in Example 1 were infected with a sample of nasal or ocular exudate of a cat suffering from "feline influenza," which was thereby a source of feline picornavirus.

The sample was mixed with the phosphate-buffered saline solution (2.0 ml.), containing also 200 units of penicillin and 100 mg. of streptomycin per millilitre.

The nutrient medium was removed from the cell line monolayer, and was replaced with the exudate-buffer mixture and incubated at 37° C. for 2 hours. The exudate buffer mixture mixture was then removed and the cells washed with fresh sterile buffer solution. The infected cell line was then incubated at 37° C. in a fresh nutrient medium (1.5 ml.).

Daily microscopic examination of the infected culture and a control culture, prepared with sterile saline solution instead of the exudate-buffer mixture, followed. It was found that the cellular degeneration (cythopatic effect) which appeared after several days of incubation, was not unlike that produced by human picornaviruses, for example the poliomyelitis virus. The virus could be transferred by serial passages in cultures of the cell strain, the suitable dilution experiments demonstrated that multiplication of the virus in the cell strain had taken place. Further tests demonstrated that the cultures so obtained by serial passages were free of contaminating other microorganisms.

EXAMPLE 6

A heteroploid line was produced by serially passaging the feline embryonic diploid cell line obtained from whole embryos according to the method described in Example 2 of U.S. Pat. 3,520,972.

Both the 19th (diploid stage) and the 46th (heteroploid stage) passage levels were infected from one pool of the feline infectious enteritis virus, as in Example 3 of the present specification. The percentage of infected cells was 66% and 67%, respectively.

EXAMPLE 7

Cultures of the feline embryonic heteroploid cell line obtained in Example 1 was infected with the feline infectious enteritis virus in the usual manner. After incubation the cultures were frozen and thawed three times and then treated with a solution of 40% formaldehyde so as to adjust its concentration in the medium to 0.2%. The culture was incubated with the inactivating agent at 37° C. for 3 days.

To one sample of the treated cultures was added phosphate buffered saline solution (PBS), sufficient to make the final concentration 25% PBS. To another sample alhydrogel was added to adjust the concentration to 25%.

Groups of five cats were subcutaneously inoculated with 1 ml. of each type of the above vaccines. respectively. Twenty-one days later the cats received a second dose of the same quantity.

After a further twenty-one days all vaccinated cats and three control cats were challenged orally with virulent feline infectious enteritis virus. None of the vaccinated animals died whereas two of the controls succumbed.

It was concluded that the inactivated vaccine produced in the above manner gave satisfactory protection.

EXAMPLE 8

Feline infectious enteritis virus was passaged 48 times in cultures of the feline embryonic heteroploid cell line, in a manner described in Example 3. The virus strain present in the culture fluid and cells of the last stage of subculturing was subcutaneously administered to three cats, without any dilution, in a dosage of 1 ml. Satisfactory leucocyte counts were observed at various stages after inoculation, and two of the animals challenged on the 21st day after inoculation survived the test. All but one control animal succumbed to the infection.

EXAMPLE 9

Three volume parts of the liquid vaccine prepared according to Example 8 was mixed with two volume parts of a 25% sorbitol solution and two volume parts of a 25% "Sol-u-pro" (trademark) solution. The mixture was freeze-dried, and two samples of the dry product were kept at 30° C. for 47 and 75 weeks, respectively, and two other samples at 4° C. for the same periods. The reconstituted vaccines were shown to have satisfactory titres in tissue culture tests.

Nine week old kittens were inoculated with samples of the vaccine and a further dosage was administered two weeks later. After a further fourteen days the animals were bled and a satisfactory level of antibody was shown in all of the experimental animals.

What we claim is:

1. A method of producing a continuous, established, feline embryonic heteroploid cell line with epithelial characteristics from the morphological point of view, and which is capable of producing tumors in hamster cheek pouches, characterized in that not more than 75% of the cells have their chromosomal composition unchanged as compared with the chromosomes of cells of feline embryos, comprising: (a) successively passaging a diploid cell line, derived from tissues of feline embroys in a culturing medium containing Eagle's Basal Medium and bovine serum, so as to form monolayer cultures having confluent sheets of cells, each of said passages being into a fresh culturing medium, (b) treating said confluent sheets of cells with trypsin or a chelating agent before each successive passage into a fresh culturing medium. and (c) continuing said passaging beyond the 40th to 50th passage level and until the proportion of cells having abnormal chromosomal characteristics as compared with the chromosomes of cells of feline embryos rises above 25%, said culturing medium being maintained at 32° C. to 39° C.

2. A method according to claim 1 wherein the temperature of the culturing medium ranges from 32° C. to 39° C.

3. A continuous, established, feline embryonic heteroploid cell line produced by the method of claim 1.

4. A culture comprising a continuous, established, feline embryonic heteroploid cell line of claim 3 in a culture medium therefor.

References Cited

UNITED STATES PATENTS

| | | | |
|---|---|---|---|
| 3,562,387 | 2/1971 | Lauerman | 424—89 |
| 3,520,972 | 7/1970 | Smith et al. | 424—89 |
| 3,293,130 | 12/1966 | Slater et al. | 424—89 |

OTHER REFERENCES

Derwent Pharmaceuticals Patents Documentation Farmdoc #28149, (Wellcome Foundn. Ltd. Neth. 6702396, Pub. Aug. 21, 1967, based on br. 7258/66, February 18. 1966; br. 40225, Sept. 8, 1966, pp. 95–102 book no. 653, issued Sept. 12, 1967, in posl. Oct. 4, 1967, posl. #R-710 D4.

Catalog, Flow Laboratories, Inc., May 1967, pp. 1–12, "Tissue Cultures, Media, Sera, Reagents and Laboratory Equip.

SHEP K. ROSE, Primary Examiner

U.S. Cl. X.R.

195—1.3; 424—89

UNITED STATES PATENT OFFICE
CERTIFICATE OF CORRECTION

Patent No. 3,709,782  Dated January 9, 1973

Inventor(s) Sydney Edwin Smith, Kevin J. O'Reilly, and John Prydie

It is certified that error appears in the above-identified patent and that said Letters Patent are hereby corrected as shown below:

Column 6, line 1 of table, fourth column, "21,000" should read --21,800--.

Column 6, line 72, delete "mixture" after --mixture--.

Claim 2, line 2, "32°C. to 39°C." should read --within 35°C. to 37.5°C.--

Column 5, line 45, "intronuclear" should read --intranuclear--.

Signed and sealed this 26th day of June 1973.

(SEAL)
Attest:

EDWARD M. FLETCHER, JR.
Attesting Officer

ROBERT GOTTSCHALK
Commissioner of Patents